(12) United States Patent
Sano et al.

(10) Patent No.: US 7,574,023 B2
(45) Date of Patent: Aug. 11, 2009

(54) FINGERPRINT IMAGE PICKUP DEVICE

(75) Inventors: Emiko Sano, Tokyo (JP); Masahiro Shikai, Tokyo (JP); Akihide Shiratsuki, Tokyo (JP); Toshiro Nakashima, Tokyo (JP); Takahiro Nakamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 715 days.

(21) Appl. No.: 11/239,476

(22) Filed: Sep. 30, 2005

(65) Prior Publication Data
US 2006/0072796 A1  Apr. 6, 2006

(30) Foreign Application Priority Data
Oct. 1, 2004  (JP)  ............... P2004-290574

(51) Int. Cl.
G06K 9/00 (2006.01)
(52) U.S. Cl. ............ 382/124; 382/126; 356/71; 396/15
(58) Field of Classification Search ........... 382/115, 382/124, 126; 356/71; 396/15
See application file for complete search history.

(56) References Cited
U.S. PATENT DOCUMENTS

| | | | | |
|---|---|---|---|---|
| 4,932,776 A | * | 6/1990 | Dowling et al. | 356/71 |
| 5,187,748 A | * | 2/1993 | Lee | 382/127 |
| 5,875,025 A | * | 2/1999 | Toyoda et al. | 356/71 |
| 2004/0047518 A1 | * | 3/2004 | Tiana | 382/284 |
| 2004/0179723 A1 | * | 9/2004 | Sano et al. | 382/124 |

FOREIGN PATENT DOCUMENTS

| | | |
|---|---|---|
| JP | 10-334237 | 12/1998 |
| JP | 2003-85538 | 3/2003 |

* cited by examiner

*Primary Examiner*—Jon Chang
(74) *Attorney, Agent, or Firm*—Leydig, Voit & Mayer, Ltd.

(57) ABSTRACT

A fingerprint image pickup device includes a light source that emits a light for transmission through a fingertip portion having a fingerprint to be photographed, an image pickup unit that picks up the light from the light source and transmitted through the subject to acquire a fingerprint image in which convex and concave parts of the fingerprint are dark and bright, respectively, and an optical system that images the light transmitted through the fingertip portion on the image pickup unit. The optical system is arranged so that a distal side of the fingertip portion is tilted, at a predetermined angle, farther away from the optical system than an opposite side, with reference to a position at which a ventral side of the fingertip portion contacts a face orthogonal to an optical axis of the optical system.

20 Claims, 10 Drawing Sheets

FINGERPRINT IMAGE PICKUP DEVICE

BACKGROUND OF THE INVENTION

1. Field of the Invention

The present invention relates to a fingerprint image pickup device, and more particularly to a fingerprint image pickup device for acquiring a stable fingerprint image with better contrast, regardless of a wet state on a skin surface for fingerprint, even when the irregularities of fingerprint are obscure, whereby the performance of personal identification is improved.

2. Description of the Related Art

The conventional fingerprint image pickup device holds a finger out of contact with a fingerprint part of a fingertip portion, applies the light from the instep side (back side) of the fingertip portion and detects the light transmitted through the inside of the finger. Since the transmissivity of the light transmitted through the fingertip portion is higher in the concave part than the convex part of fingerprint, an image that is brighter in the concave part than the convex part of fingerprint is obtained (e.g., refer to JP-A-2003-85538 (pages 3 to 4, FIGS. 1 to 4)).

The conventional fingerprint image pickup device is constituted in the above way, and can acquire a stable fingerprint image, regardless of a wet state on a skin surface for fingerprint, even when the irregularities of fingerprint are obscure, but the contrast of fingerprint image is desired to be further improved.

SUMMARY OF THE INVENTION

The invention provides a fingerprint image pickup device that can produce a fingerprint image with better contrast.

According to an aspect of the present invention, a fingerprint image pickup device includes a light source for emitting a light to be transmitted through a subject that is a fingertip portion having a fingerprint to be photographed, image pickup unit that picks up the light from the light source to be transmitted through the subject to acquire a fingerprint image where a convex part of the fingerprint is dark and a concave part is bright, and an optical system for enabling the light transmitted through the subject from the light source to be imaged on the image pickup unit. The optical system is arranged so that a distal side of the fingertip portion of the subject is tilted at a predetermined angle farther away from the optical system than its opposite side with reference to a position at which a back side or ventral side of the fingertip portion is contacted on a face orthogonal to an optical axis of the optical system.

With the fingerprint image pickup device according to the invention, since a subject is a fingertip portion having a fingerprint to be photographed, a light to be transmitted through the subject from the light source is applied to the subject, an optical system enables the light transmitted through the subject from the light source to be imaged on the image pickup unit, and the image pickup unit picks up the light from the light source to be transmitted through the subject to acquire a fingerprint image where a convex part of the fingerprint is dark and a concave part is bright, it is possible to acquire a stable fingerprint image, regardless of a wet state on a skin surface for fingerprint, even when the irregularities of fingerprint are obscure.

And since the optical system is arranged so that the distal side of the fingertip portion of the subject is tilted at a predetermined angle farther away from the optical system than its opposite side with reference to a position at which the back side or ventral side of the fingertip portion is contacted on a face orthogonal to an optical axis of the optical system, it is possible to produce a fingerprint image with better contract whereby the performance of personal identification is improved.

DETAILED DESCRIPTION OF THE INVENTION

The inventors of the present invention have found that in a fingerprint image pickup device including a light source for emitting a light to be transmitted through a subject that is a fingertip portion having a fingerprint to be photographed, image pickup unit that picks up the light from the light source to be transmitted through a convex part of the fingerprint and the light from the light source to be transmitted through a concave part of the fingerprint to acquire a fingerprint image corresponding to the fingerprint where the convex part of the fingerprint is dark and the concave part is bright, and an optical system for enabling the light transmitted through the subject from the light source to be imaged on the image pickup unit, wherein the optical system is arranged so that the distal side of the fingertip portion of the subject is tilted at a predetermined angle (about 10° to 30°) farther away from the optical system than its opposite side with reference to a position at which the back side or ventral side of the fingertip portion is contacted on a face orthogonal to an optical axis of the optical system, the contrast of the fingerprint image is improved as compared with where the back side or ventral side of the fingertip portion is contacted on the face orthogonal to the optical axis of the optical system.

This is considered because the transmissivity characteristic of the internal tissue on and near the fingerprint surface has the angle dependency, the light is more likely transmitted at a specific angle.

This invention has been achieved in view of the above characteristic, and is characterized in that a fingerprint image of the subject is acquired in a state where the distal side of the fingertip portion of the subject is tilted at a predetermined angle farther away from the optical system than its opposite side with reference to a position at which the back side or ventral side of the fingertip portion is contacted on a face orthogonal to an optical axis of the optical system.

EMBODIMENT 1

Figure 1:
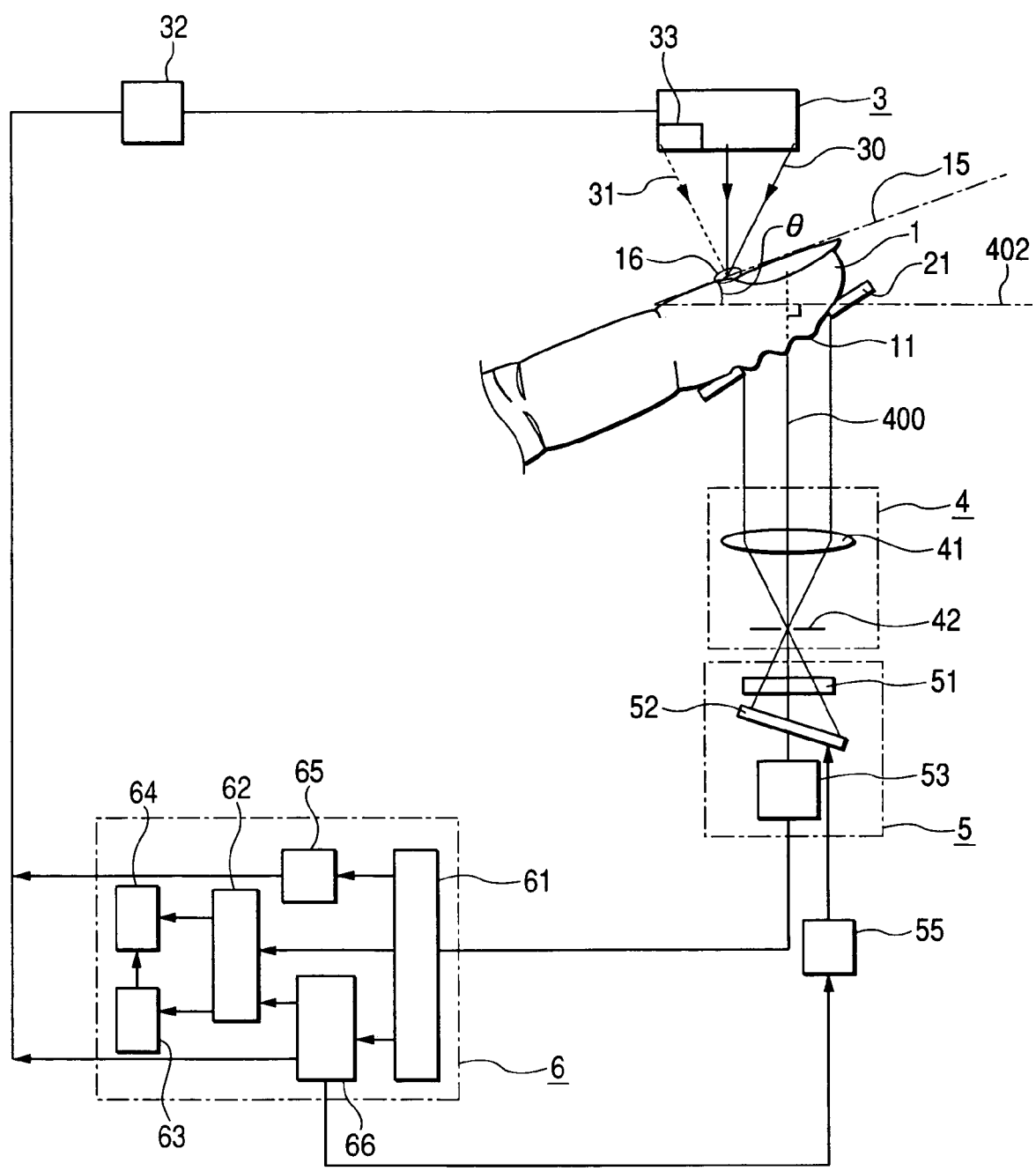
FIG. 1 is a side view showing the overall constitution of a fingerprint image pickup device according to an embodiment 1 of the present invention.
Figure 2:
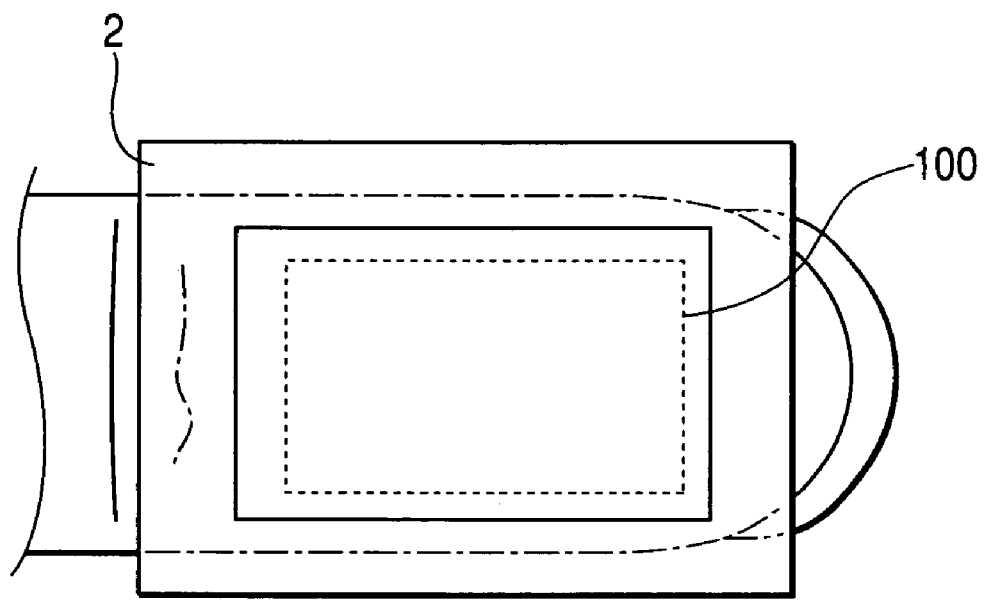
FIG. 2 is a bottom view showing a situation near a fingertip portion as seen from the ventral side according to the embodiment 1 of the invention.
Figure 3:
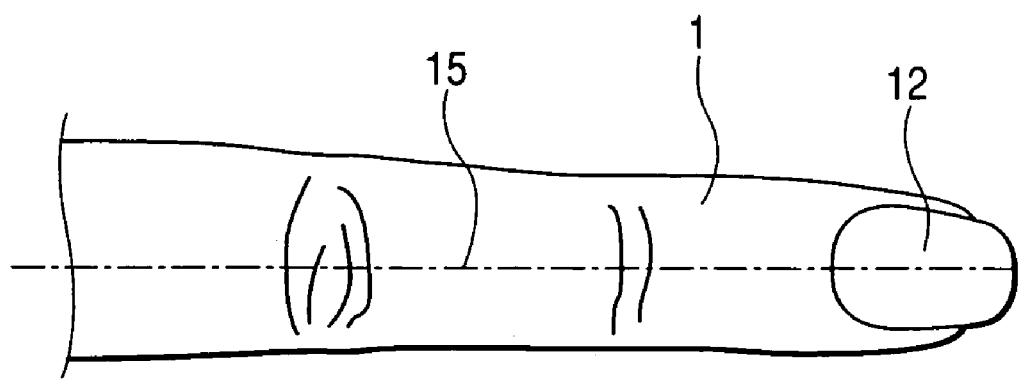
FIG. 3 is an upper view showing a situation near the fingertip portion as seen from the back side according to the embodiment 1 of the invention.

FIGS. 1 and 2 are views for explaining a fingerprint image pickup device according to an embodiment 1 of the present invention. More specifically, FIG. 1 is a side view showing the overall constitution of the fingerprint image pickup device, FIG. 2 is a bottom view showing a situation near a fingertip portion as seen from the image pickup unit side (ventral side), and FIG. 3 is an upper view showing a situation near the fingertip portion as seen from the back side (nail side).

The fingerprint image pickup device of this embodiment includes a light source 3 for emitting a light 30 to be transmitted through a subject 1 that is a fingertip portion 1 having a fingerprint 11 to be photographed, image pickup unit 5 that picks up the light from the light source 3 to be transmitted through the subject 1 to acquire a fingerprint image corresponding to the fingerprint 11 where a convex part of the fingerprint 11 is dark and a concave part is bright, an optical system 4 for enabling the light transmitted through the subject 1 from the light source 3 to be imaged on the image pickup unit 5, and a signal processing section 6 that acquires the fingerprint information by performing the image processing for a fingerprint image outputted from the image pickup unit 5 and identifies the person based on the fingerprint information, wherein the optical system 4 is arranged so that the distal side of the fingertip portion of the subject 1 is tilted at a predetermined angle farther away from the optical system 4 than its opposite side with reference to a position at which the back side of the fingertip portion is contacted on a face 402 orthogonal to an optical axis 400 of the optical system 4.

In this embodiment, the fingerprint image pickup device includes a subject holding section 21 (hereinafter referred to as a subject holding section with an opening) capable of holding the fingertip portion 1 out of contact with the surface of the fingerprint 11 to be photographed. An opening portion of the subject holding section with opening 21 is provided to include an observation face 100 that is a range where the image pickup unit 5 picks up the image.

The fingertip portion 1 that is the subject has a fingerprint 11 to be photographed on the ventral side, in which the fingerprint 1 has convex and concave patterns consisting of a convex part (ridge part) and a concave part (trough part) In this invention, the fingertip portion 1 refers to not only the tip of a finger but also a portion from the tip of finger to the distal joint, or near the proximal joint.

The light source 3 for emitting the light 30 to be transmitted through the fingertip portion 1 toward the fingertip portion 30 is provided to cause the light to proceed from the back side (nail side) on the opposite side of the fingerprint 11 of the fingertip portion 1 to the ventral side (fingerprint side). The light source 3 has a dominant wavelength in a region from red rays to near infrared rays, namely, may emit a projection light having any wavelength (monochrome) in the region from red rays to near infrared rays, a projection light in which lights in the region from red rays to near infrared rays are mixed, or a projection light containing the light in the region from red rays to near infrared rays (monochrome or chromatic) as the dominant wavelength. For example, the light source may be a laser, a light emitting diode, or a lamp light source. The light in the region from red rays to near infrared rays is preferably employed because of high transmissivity of the light to the living body that is the subject 1, but the dominant wavelength is more preferably in a range from 600 nm to 1400 nm. Moreover, since the light absorption characteristic of hemoglobin in the blood vessel is minimum at about 660 nm, the light in the region where the dominant wavelength is from 630 nm to 780 nm is more preferable to reduce the influence of the blood vessel on the fingerprint image.

Also, to avoid the influence of light from the outside, the fingertip portion 1 and the light source 3 may be covered with a light shielding body.

The light source 3 is composed of one or more of a laser; a light emitting diode and a lamp light source, and any number of lights can be turned on. The fingertip portion 1 is held by the subject holding section with opening 2, and when the observation face 100 is at a position contained within the opening of the subject holding section with opening 2, the light source 3 is placed to illuminate a predetermined area 16. Also, the illuminating condition (brightness and illumination area 16) of the light 30 to be applied to the subject 1 can be controlled by the light source drive circuit 32 that controls the element to be lighted. For example, when the light source 3 is composed of a plurality of light emitting elements, each element, or a small group of elements made to illuminate the same position (area) is installed to illuminate a different position (area) of the fingertip 1, and the element to be lighted is changed in accordance with the position (area) to be illuminated. When the light 3 does not have a plurality of light emitting elements but has a single element, a drive section may be provided to control the light source to be moved to the position (area) to be illuminated.

Controlling the illumination area 16 includes both the position control and the area size control.

Also, the fingerprint image pickup device according to the embodiment includes a marker light source 33 for applying a marker light 31 for positioning of the subject 1 to the subject 1.

The marker light source 33 is placed such that the marker light 31 is not incident upon an image pickup element 52, if the fingertip portion 1 that is the subject is laid on the subject holding section with opening 2 to cover the opening portion, and the marker light 31 is incident upon the image pickup element 52 in a state where the fingertip portion 1 is not laid on the subject holding section with opening 2.

Moreover, if the subject 1 is moved to apply the marker light 31 to a predetermined position of the subject (fingertip portion) 1, the subject 1 can be disposed at a position where the light 30 from the light source 3 is applied to the illumination area 16.

Though the marker light source 33 may be commonly employed with the light source 3, the marker light 31 may be projected from another light source to one or more positions of a curve along the arrow or nail cuticle or any other meaningful pattern which the person can decipher to be helpful to understand the position where the finger is held up.

Also, the wavelength of the marker light 31 is not only in the region from red rays to near infrared rays, but also in the region of visible rays visually seen by the user.

The optical system 4 focuses the light from the light source 3 transmitted through the convex part of the fingerprint 11 in the fingertip portion 1 and the light from the light source 3 transmitted through the concave part of the fingerprint 11 on the image pickup element 52. In this embodiment, the optical system 4 includes a lens 41 at a position where the transmitted light from the fingertip portion 1 firstly passes and a diaphragm 42 at a position where the transmitted light passes next to the lens 41 and which is telecentric on the object side (subject 1 side).

To acquire the clearer fingerprint image, the optical system may be composed of a plurality of lenses, including the lens 41 having principally the telecentric effect, a lens principally contributing to image formation that is placed at a position where the light passes after the diaphragm 42, and a lens having the effect of removing the distortion from the image.

The ventral side of the fingertip portion 1, namely, the surface of the fingerprint 11 to be photographed, is a curved surface, and the distance between the fingerprint 11 and the image pickup element 52 is different depending on the position within the observation face 100, thereby causing the image to be distorted due to fuzziness or different magnification depending on the position. Thus, the optical system telecentric on the object side is employed, whereby the fingerprint image with better contrast is acquired without having influence of varying magnification.

In the image pickup unit 5 (hereinafter often referred to as an image pickup system 5), the light having an intensity distribution and transmitted through the internal tissue of the fingertip portion 1 is imaged by the optical system 4 to acquire the fingerprint image corresponding to the fingerprint. The image pickup unit 5 includes a wavelength selection element 51 as wavelength selection unit, an image pickup element 52, and an image output circuit 53 for converting an electric signal from the image pickup element 52 to an image electric signal.

The wavelength selection element 51 (wavelength selection unit) selectively passes the light (in the region from red rays to near infrared rays) having a wavelength equivalent to the wavelength of the light source 3. Examples of the wavelength selection element 51 include an interference filter, a filter glass, and a plastic filter. An output light signal from the wavelength selection element 51 is imaged on the image pickup element 52.

Though the wavelength selection unit 51 is provided between the diaphragm 42 and the image pickup element 52 in FIG. 1, the wavelength selection unit 51 may be provided at a position between the lens 41 and the fingertip portion 1, between the lenses in the case where the lens 41 is composed of a plurality of lenses, or between the lens 41 and the diaphragm 42. Also, the lens 41 or the image pickup element 52 having a wavelength selection function may be employed.

The image pickup element 52 may be a two-dimensional solid-state image pickup device or a camera tube such as a CCD (Charge Coupled Device) or a CMOS (Complementary Metal Oxide Semiconductor) image sensor. The image pickup element 52 has a sensitivity to the light passing through the fingertip portion 1 to be transmitted through the internal tissue of the fingertip portion 1, namely, the light in the region from red rays to near infrared rays. The image pickup unit 5 is shielded not to receive any light other than from the fingertip portion 1. Also, a gain adjusting circuit 55 for adjusting the gain of the image pickup element 52 is provided.

A signal processing section 6 includes an image receiving section 61 that receives a signal from the image output circuit 53, an image processing section 62 that performs the binarization and thinning processing for a signal from the image receiving section 61, a fingerprint data saving section 63 that saves a signal received from the image processing section 62 as a registered image, and a personal identification section 64 that makes the personal identification by collating the image from the image processing section 62 with the image from the fingerprint data saving section 63, whereby the fingerprint image outputted from the image output circuit 53 is processed to obtain the fingerprint information, and identify the person based on the fingerprint information.

Moreover, the signal processing section 6 includes a finger existence determining section 65 that determines whether or not the finger exists by processing a signal from the image receiving section 61 and determines whether or not the signal falls within a predetermined threshold range to send the signal to the light source drive circuit 32, and a lightness determining section 66 that determines whether or not the lightness of the fingerprint image taken in by the image receiving section 61 is within a predetermined threshold range, sending a signal to the light source drive circuit 32 and the gain adjusting circuit 55 based on the determination result, and adjusting the strength of the light 30 from the light source 3 to illuminate the fingertip portion 1 and the number of elements to be lighted and the gain of the image pickup element 52.

The signal processing section 6 does not need to be provided with all the functions, but may be provided partially with the functions by connecting the image output circuit 53 to a personal computer. Also, when fingerprint data is saved but the personal identification is not made, for example the personal identification section 64 may be omitted.

Next, the relationship between the illumination area (position) of the light 30 from the light source 3 and the lightness of obtained fingerprint image will be described below.

The inventors of the present invention have found that the shading of a fingerprint image is affected by an illuminating position of light 30, when a subject is a fingertip portion 1 having a fingerprint 11 to be photographed, a light 30 to be transmitted through the subject 1 from the light source 3 is applied to the subject 1, the light 30 transmitted through the subject 1 from the light source 3 is imaged onto image pickup unit 5 (image pickup element 52) in the optical system 4, and the light 30 transmitted through the subject 1 from the light source 3 is picked up by the image pickup unit 5 to acquire a fingerprint image in which the convex part of the fingerprint 11 is dark and the concave part is bright. If the light is applied principally to the nail 12, the nail tip is saturated and the root side is dark, if the light is applied near the border of the nail 12 to any other part than the nail 12, the shading of the entire fingerprint image is gentler, or if the light is applied near the distal joint, the root side is bright and the nail tip is dark.

The inventors have estimated that the light striking the bone, which serves as a second light source, is scattered over a wide angle and transmitted through the fingertip portion up to a fingerprint portion at relatively uniform strength, but since the bone at the fingertip reaches only halfway of the nail 12, if the light 30 from the light source is applied principally to the nail 12, the light not striking the bone is directly transmitted to intensify the shading.

Thereby, the inventors have concluded that if the light 30 is applied to any other portion than the nail 12 near the border of the nail 12, a fingerprint image with relieved shading can be picked up, contributing to the proper lightness in a range where the fingerprint information required for personal identification that is a main part is contained.

The range where the fingerprint information required for personal identification is contained as used in the invention includes an area from the distal joint of finger to the fingertip, an area including the distal joint part, or an area including the fingerprint on the lateral face of finger, for example.

Figure 4:
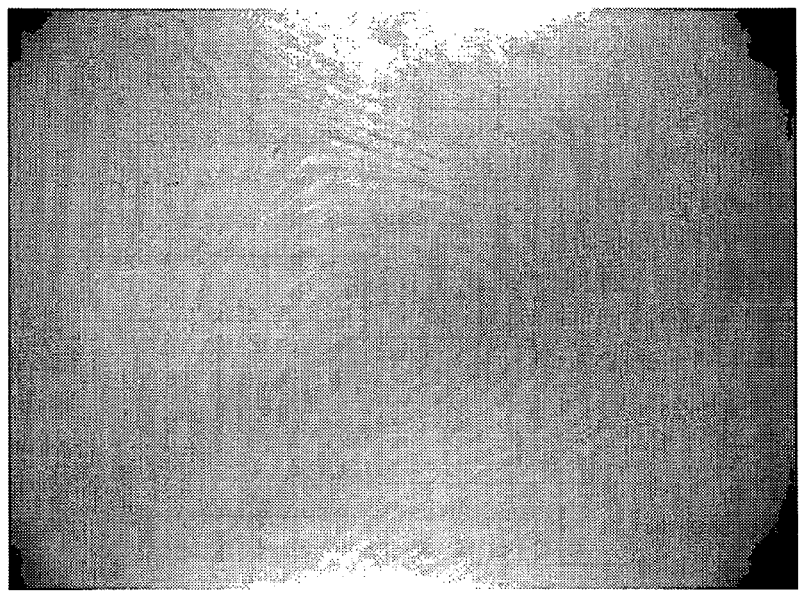
FIG. 4 is a view showing a fingerprint image picked up by a CCD according to the embodiment 1 of the invention.
Figure 5:
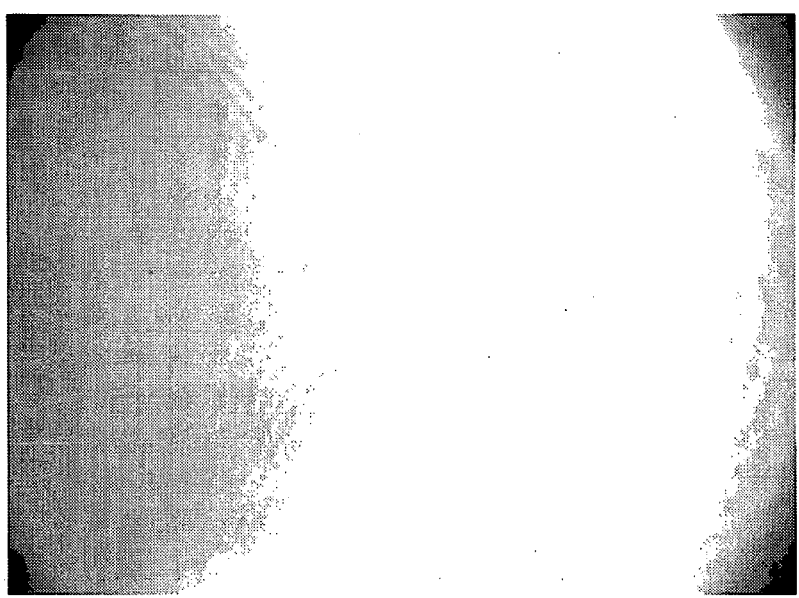
FIG. 5 is a view showing a fingerprint image picked up by the CCD according to the embodiment 1 of the invention.
Figure 6:
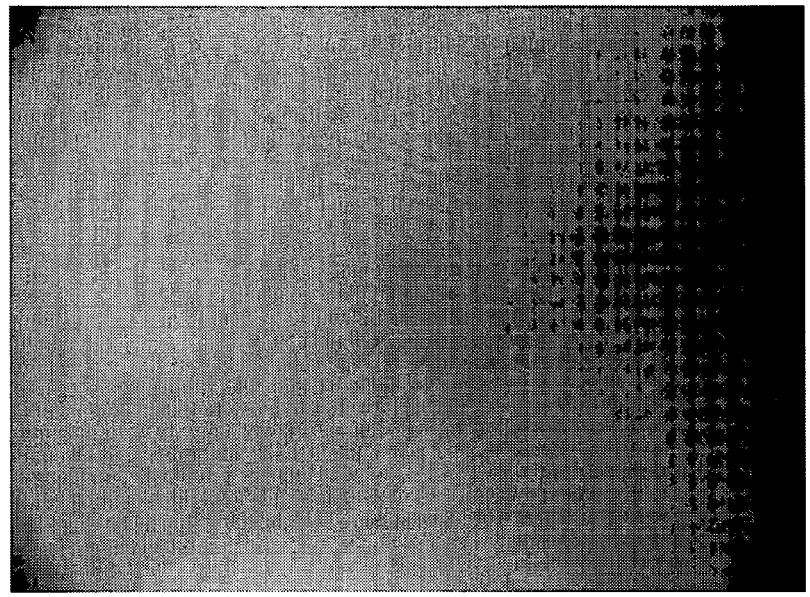
FIG. 6 is a view showing a fingerprint image picked up by the CCD according to the embodiment 1 of the invention.
Figure 7:
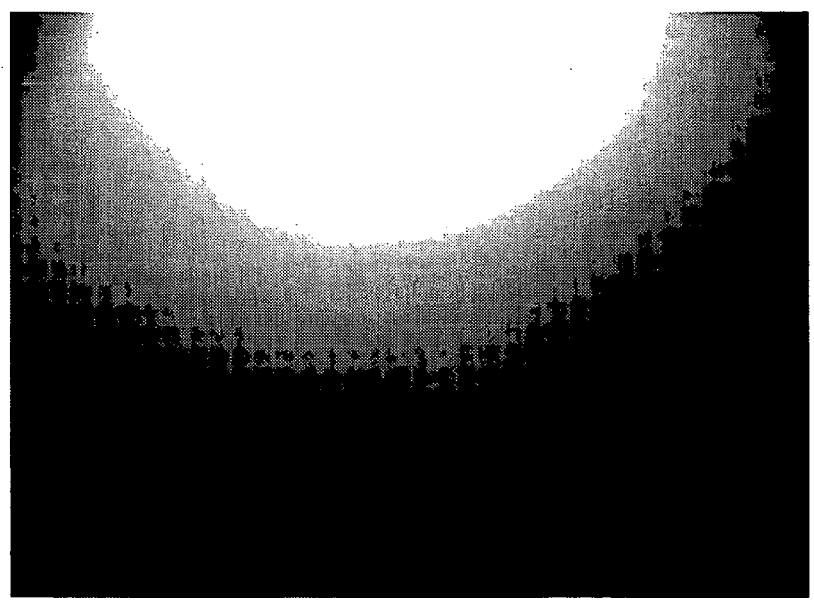
FIG. 7 is a view showing a fingerprint image picked up by the CCD according to the embodiment 1 of the invention.
Figure 8:
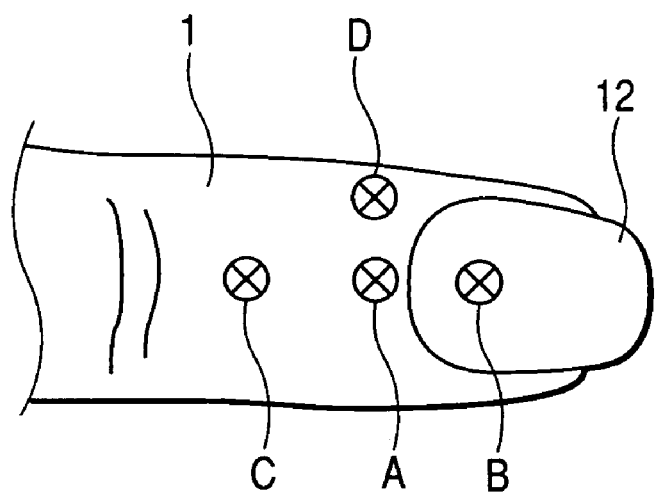
FIG. 8 is a view showing the light illuminating points A to D on the back side of the fingertip portion according to the embodiment 1 of the invention.

FIGS. 4 to 7 are views showing the fingerprint image picked up by the CCD when the light (laser beam) 30 is applied like a spot to each of the points A to D in FIG. 8. FIG. 4 shows a fingerprint image when a laser beam 30 is applied to point A of FIG. 8, FIG. 5 shows a fingerprint image when a laser beam 30 is applied to point B of FIG. 8, FIG. 6 shows a fingerprint image when a laser beam 30 is applied to point C of FIG. 8, and FIG. 7 shows a fingerprint image when a laser beam 30 is applied to point D of FIG. 8. In these figures, the right side is the nail tip side (distal side of the fingertip portion 1). FIG. 7 is a view showing the illuminating points A to D of the light 30 to the back side of the fingertip portion 1.

Though the luminosity is almost uniform over the entire face of fingerprint image in FIG. 4, the nail tip side (distal side of the fingertip portion) near the illumination area 16 (point B) is saturated in FIG. 5, and the nail tip side far from the illumination area 16 (point C) is dark in FIG. 6. In the width direction of the fingertip portion 1, it will be seen from FIG. 7 that a portion near the illumination area 16 (point D) is saturated and the opposite side is dark.

Though the observation face on the ventral side of the fingertip portion 11 is tilted at a predetermined angle to the face 402 orthogonal to the optical axis 400 of the optical system 4 in FIG. 1, the observation face on the ventral side of the fingertip portion 11 is almost parallel to the face 402 orthogonal to the optical axis 400 of the optical system 4 in FIGS. 4 to 7. When the observation face on the ventral side of the fingertip portion 11 is tilted at the predetermined angle to the face 402 orthogonal to the optical axis 400 of the optical system 4, the contrast of obtained fingerprint image is improved but the relationship between the illumination point and the light and darkness of fingerprint image is the same as the above result, as will be detailed later.

From these results, to acquire the fingerprint image having almost uniform luminosity over the almost entire face in the range where the fingerprint information required for personal identification is contained, it is preferred that the light illuminates any other portion than the nail 12 in which the point A of FIG. 8, or the center of illumination is located on the center line in the width direction on the face where the nail 12 of the fingertip portion 1 exists and on the opposite side of the nail 12 to the border of the nail 12.

Figure 9:
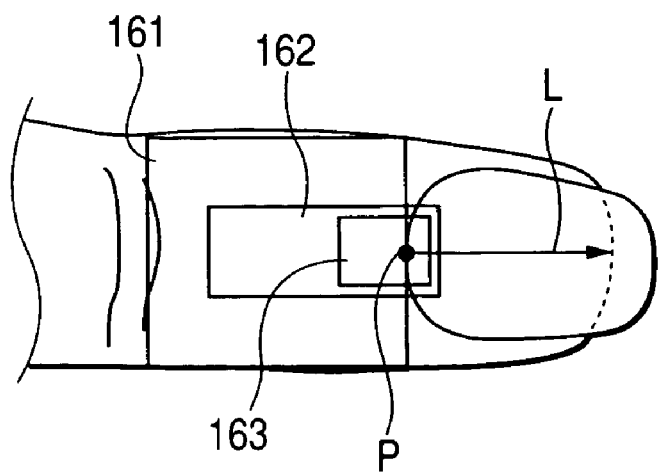
FIG. 9 is a view for explaining an illumination area according to the embodiment 1 of the invention.

The specific illumination areas 16 may include the point A (spot area) of FIG. 8, and a first illumination area 161, a second illumination area 162 and a third illumination area is 163 as shown in FIG. 9, for example.

The first illumination area 161 is the area from the point P on the nail border to the distal joint on the root in the longitudinal direction, and not beyond the width of the fingertip portion 1 in the width direction, in which the center in the longitudinal direction is located at a position about half the length from the point P on the nail border to the distal joint.

The second illumination area 162 is the area where the root end portion is located at a position about three-fourths the length from the point P on the nail border to the distal joint in the longitudinal direction, and the distal end portion is located at a position nearer the distal end than the point P on the nail border, with the width being about one-third the width of finger, in which the center in the longitudinal direction is located at a position about one-third the length from the point P on the nail border to the distal joint.

The third illumination area 163 is the area where the root end portion is located at a position about one-fifth the length from the point P on the nail border to the distal joint in the longitudinal direction, and the distal end portion is located at a position nearer the distal end than the point P on the nail border, with the width being about one-fifth the width of finger, in which the center in the longitudinal direction is located at a position about one-tenth the length from the point P on the nail border to the distal joint.

The distal end portion in the longitudinal direction is preferably coincident with the point P on the nail border, but may slightly touch the nail 12. Assuming that the length from the point P on the nail border to the distal end of the fingertip portion 1 is L, the distal end portion in the longitudinal direction is preferably about one-third the length L from the point P on the nail border, more preferably about one-fourth the length L, and most preferably on a nail scarfskin (portion corresponding to epidermis of the nail).

Moreover, the shape of the illumination area 16 may be like an ellipse or rectangle inscribed in the area.

Since the near infrared light has a low transmissivity in the blood of the living body, the fingerprint image outputted from the image pickup unit S has lower lightness to decrease the contrast, when the pattern of blood vessel inside the fingertip portion 1 is superposed on the convex and concave pattern of the fingerprint 11. When one portion is extremely darker than other portions, the shading may be increased to make the portion brighter in picking up the image. For example, when the lightness of image in the portion on the nail tip side of the fingertip portion 1 is low, the light 30 from the light source 3 is applied intentionally to touch the nail 12, and the brightness or the gain of the image pickup element is adjusted, as needed, to make proper the lightness in the portion having low lightness of image on the nail tip side of the fingertip portion 1, in picking up the image, whereby the contrast of the portion having low lightness is improved. In this way, the shading is controlled by moving the illumination area (position) of the light 30 in the fingertip portion 1, partially improving the contrast.

Next, the constitution of tilting the fingertip portion 1 at a predetermined angle to improve the contrast of the fingerprint image will be described below.

As shown in FIGS. 1 and 3, the straight line passing near the center of the finger in the width direction on the nail side (back side) of the fingertip portion 1 and contact with the back side of the fingertip portion 1 is defined as the straight line 15 representing the back side of the fingertip portion. When the subject holding section with opening 21 holds the fingertip portion 1, the optical system is arranged so that the distal side of the fingertip portion of the subject 1 is tilted at a predetermined angle (θ) farther away from the optical system 4 (lens 41) than its opposite side with reference to a position at which the back side of the fingertip portion 1 is contacted on the face 402 orthogonal to the optical axis 400 decided by the optical system 4. That is, the optical system 4 and the subject holding section with opening 21 are arranged so that the angle made by the face 402 orthogonal to the optical axis 400 of the optical system 4 and the straight line 15 representing the back side of the fingertip portion 1 may be the predetermined angle (θ).

Figure 10:
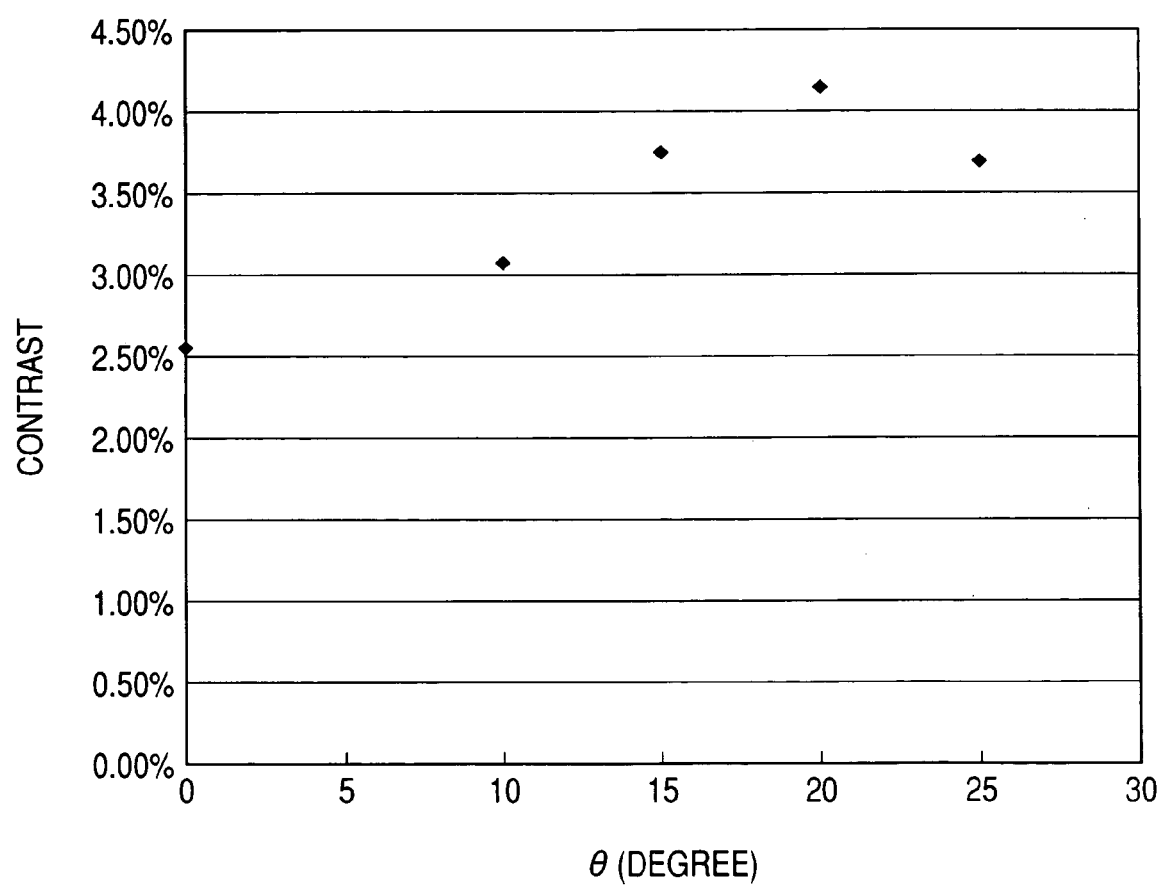
FIG. 10 is a graph showing the relationship between the angle ($\theta$) made by a straight line 15 representing the back side of the fingertip portion and a face 402 orthogonal to the optical axis 300 and the contrast of fingerprint image according to the embodiment 1 of the invention.

FIG. 10 shows the relationship between the angle (θ) made by the straight line 15 representing the back side of the fingertip portion and the face 402 having the optical axis 300 as perpendicular and the contrast of the fingerprint image.

Figure 11:
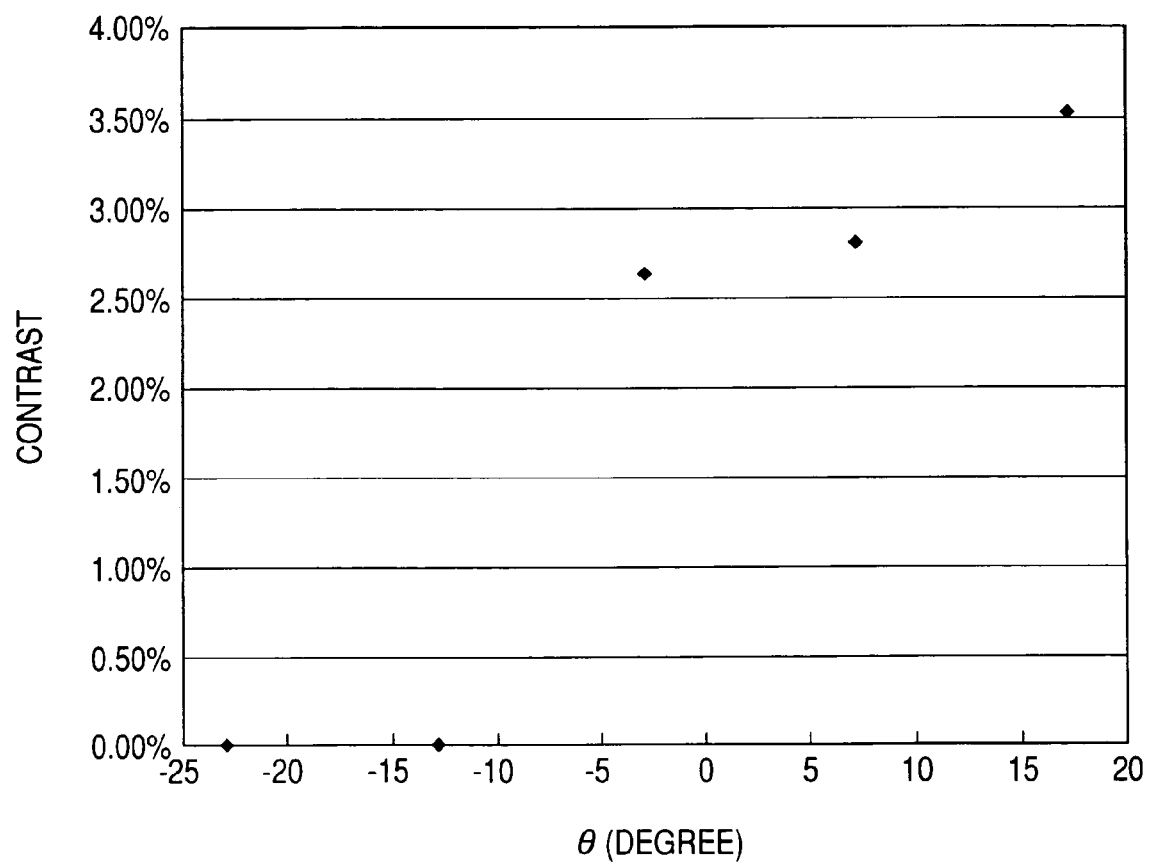
FIG. 11 is a graph showing the relationship between the angle ($\theta$) made by the straight line 15 representing the back side of the fingertip portion and the face 402 orthogonal to the optical axis 300 and the contrast of fingerprint image according to the embodiment 1 of the invention.

Also, FIG. 11 shows the relationship between the angle (θ) and the contrast when the distal end of the fingertip portion 1 is tilted to be closer (θ is negative) to the optical system 4 than the opposite side, with the same constitution and employing a sample different from that in FIG. 10 (subject 1).

From FIGS. 10 and 11, it will be apparent that the contrast of the fingerprint image is improved when the inclination angle θ is from 10° to 30°, more preferably from 15° to 20°, and most preferably about 20°.

Since the ventral side of the fingertip portion 1 is a curved face, and the fingertip portion 1 is tilted to the optical axis 400 of the optical system 4, the observation face 100 has an angle to the optical axis 400, whereby it is difficult to be focused on all the observation face 100. Thus, to be focused on all the observation face 100, the depth of field of the optical system 4 is increased, and the image pickup element 52 is tilted to the optical axis 400 as shown in FIG. 1.

In this way, since the depth of field of the optical system 4 is increased, and the image pickup element 52 is tilted to the optical axis 400, the entire area of the observation face 100 in the fingertip portion 1 is contained within the depth of field of the optical system 4, whereby the image with better contrast is produced.

The operation will be described below.

First of all, the marker light 31 is turned on with a quantity of light adequate for visual inspection, and the image is picked up at a regular interval by the image pickup element 52.

If the fingertip portion 1 is placed to intercept the marker light 31, the light source 31 is shut out, so that the image obtained by the image pickup element 52 has a predetermined range of lightness. The image obtained by the image pickup element 52 is taken in from the image output circuit 53 into the signal processing section 6 by the image receiving section 61 of the signal processing section 6. Moreover, it is sent to the finger existence determination section 65 by the image receiving section 61, whereby if the lightness in the certain range on the image pickup element 52 (image obtained by the image pickup element 52) made by intercepting the marker light 31 with the fingertip portion 1 is within a predetermined threshold range, it is determined that the fingertip portion 1 exists in the image pickup range of the image pickup element 52.

At the same time, if the user moves the fingertip portion 1, while inspecting visually, so that the marker light 31 may strike the optimal position of the fingertip portion 1, the light 30 from the light source 3 is projected to the illumination area 16 of the fingertip 1, which is the condition that the luminosity is almost uniform over the entire area of the fingerprint image. Thereby, the shading is optimized by optimizing the illuminating position of the light 30 from the light source 3 to the fingertip portion 1 and the quantity of illuminating light to the brightness of image can be more efficient.

If the finger existence determination section 65 determines that the fingertip portion 1 exists within the image pickup range of the image pickup element 52, it sends a signal to the light source drive circuit 32 to project the light 30 to be transmitted through the fingertip portion 1, and turns the light source 3 by adjusting the number of elements to be lighted and the luminosity per element so that the light 30 from the light source 3 may have a predetermined luminosity. When the light source 3 is turned on, the marker light source 33 may be turned off, or kept on.

The light 30 applied on the back face (opposite face of the fingerprint 11) of the fingertip portion 1 is transmitted through the inside of finger to reach the fingerprint 11. The internal tissue near the surface on the ventral side of the fingertip portion 1 has a transmissivity distribution corresponding to the convex and concave pattern of the fingerprint 11, in which the light transmissivity of the internal tissue corresponding to the convex part of the fingerprint is low and the light transmissivity of the internal tissue corresponding to the concave part is high, so that the brightness of the light transmitted through the latter is higher than the former.

The light transmitted through the fingertip portion 1 and having an intensity distribution according to the fingerprint 11, of which the angle (θ) made between the straight line 15 representing the back side of the fingertip portion 1 and the face 402 is from 10° to 30°, more preferably from 15° 25°, and most preferably about 20°, is imaged on the image pickup element 52 by the lens 41 and the diaphragm 42 in the optical system 4 optically designed to be telecentric on the object side (the side of the fingertip portion 1 that is the subject) Between the diaphragm 42 and the image pickup element 52, the wavelength selection element 51 is arranged to select the light (in the region from red rays to near infrared rays) having the wavelength equivalent to that of the light source 3. The image output circuit 53 inputs an electric signal from the image pickup element 52, and outputs the fingerprint image where the ridge part (convex part) of fingerprint is brighter than the trough part (concave part) as the image electric signal.

The fingerprint image obtained in this way by the image pickup unit 5 is taken in by the image receiving section 61 provided for the signal processing section 6, and sent to the image processing section 62. The image processing section 62 performs the image processing of binarization and thinning for the fingerprint image to extract the fingerprint feature information (fingerprint information), as described in JP-A-10-334237, for example. The extracted data is saved in the fingerprint data saving section 63, as needed. The personal identification section 64 collates the data outputted from the image processing section 62 with the data saved in the fingerprint data saving section 63 to identify the person.

Thus, in this embodiment, the lightness determination section 66 is provided in the signal processing section 6, whereby before the image processing section 62 extracts the feature information of fingerprint, the lightness determination section 66 determines whether or not the lightness of the fingerprint image is excessive or not. Thereby, at least one of the illuminating condition (brightness of the light source 3 or illumination area 16) and the gain of the image pickup element 52 is adjusted to gather the image of the optimal lightness, and the image is picked up again.

For that purpose, the lightness determination section 66 determines whether or not the lightness of the fingerprint image outputted from the image receiving section 61 is within a predetermined threshold range, at least one or both of the light source drive circuit 32 and the gain adjusting circuit 55 are controlled so that the lightness may be within the predetermined threshold range, and the image is picked up again by the image pickup element 52. That is, an electric signal is sent to the light source drive circuit 32 to drive the light source 3 to emit a projection light 30 having brightness as high as possible in the range where the lightness is not saturated, if the lightness of the fingerprint image is lower than the predetermined threshold range, or to drive the light source 3 to emit a projection light 30 having low brightness, if the lightness of the fingerprint image is higher than the predetermined threshold range.

In this way, by setting the threshold of lightness of the fingerprint image to a proper value, it is possible to prevent the fingerprint image and the identification performance from degrading due to a cause of the lightness.

Though in the above embodiment, the lens 41 is employed as image formation unit, any other unit than the image formation lens may be employed such as a pinhole having an image formation function.

Also, in the above embodiment, since the near infrared light has a low transmissivity in the blood of the living body, in the fingerprint image outputted from the image pickup unit 5, the pattern of blood vessel inside the fingertip portion 1 is superposed on the convex and concave pattern of the fingerprint. Thus, the pattern of blood vessel may be removed from the fingerprint image outputted from the image pickup unit 5 in the following way.

That is, first of all, supposing the fingerprint image outputted from the image pickup unit 5 as the original image, the original image is smoothed to acquire a smoothed image. The convex and concave pattern of fingerprint has thinner lines than the pattern of blood vessel, whereby the convex and concave pattern of fingerprint is removed and the pattern of blood vessel is left in the smoothed image. And if a differential operation between the original image and the smoothed image is made, the fingerprint image in which the convex and concave pattern of fingerprint is only left is obtained, and the feature information of fingerprint is extracted from this fingerprint image.

Though the fingerprint image obtained by the image pickup unit 5 is processed by the signal processing section 6 to identify the person in the above explanation, needless to say, the fingerprint image may be simply acquired without personal identification.

Figure 12:
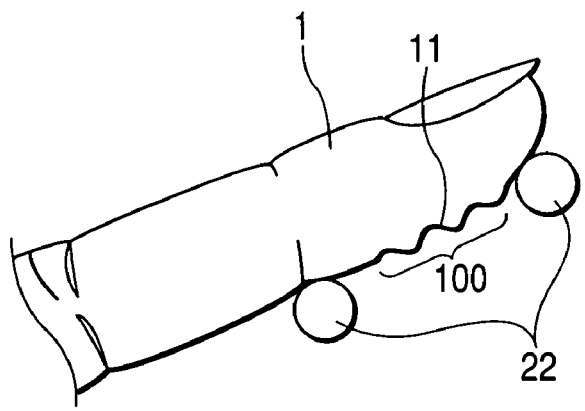
FIG. 12 is a side view showing another constitution of an essential part of the fingerprint image pickup device according to the embodiment 1 of the invention.

Though the subject holding section with opening 21 having a frame shape is shown as the subject holding section capable of holding the subject out of contact with the surface of fingerprint to be photographed in FIGS. 1 and 2, it is only necessary that the subject holding section can decide the angle and position of the fingertip portion 1 and hold the fingertip portion 1 out of contact with the surface of the fingerprint 11, in which one pair of rod-like subject holding sections 22 opposed, with the observation face 100 between them, outside the observation face 100 may be employed to hold the distal end on the ventral side and the root on the ventral side of the fingertip portion 1, for example, as shown in FIG. 12.

Figure 13:
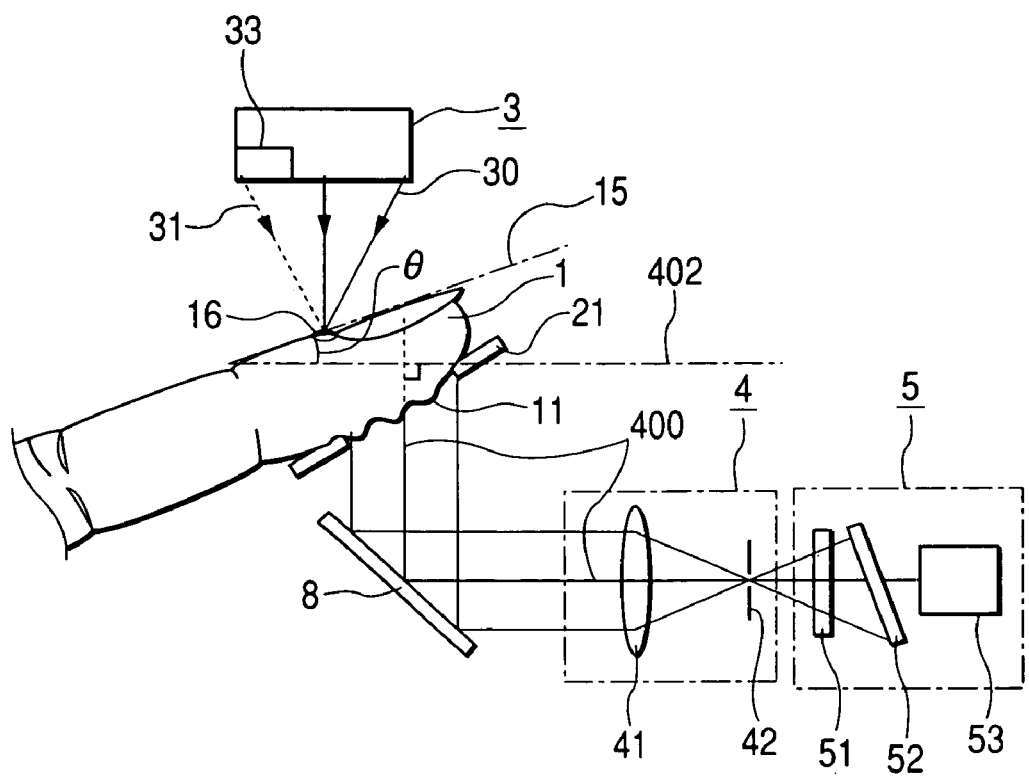
FIG. 13 is a side view showing another overall constitution of the fingerprint image pickup device according to the embodiment 1 of the invention.

Also, to reduce the total size of the apparatus, a plane mirror 8 as a reflecting unit may be installed to deflect the light transmitted through the fingertip portion 1 and the optical system 4, the wavelength selection element 51, and the image pickup element 52 may be installed to be opposed to the deflected light, as shown in FIG. 13. In FIG. 13, the signal processing section 6 is omitted.

The reflecting unit is not limited to the plane mirror 8, but may be a curved-face mirror to reduce a distortion and an aberration of the image.

Also, a plurality of reflecting units may be provided to further reduce the size.

Also, the plane mirror 8 is not necessarily provided between the lens 42 and the fingertip portion 1, but may be provided, for example, between the lens 41 and the diaphragm 42, or between the image pickup element 42 and the fingertip portion 1.

In the following embodiments, though not specifically noted, a reflecting unit may be provided to deflect the light transmitted through the fingertip portion 1 in the same way as in FIG. 13, whereby the total size of the apparatus can be reduced.

As described above, with this embodiment, the fingerprint image pickup device includes the light source 3 for emitting a light 30 to be transmitted through the subject that is the fingertip portion 1 having the fingerprint 11 to be photographed, the image pickup unit 5 for picking up the light from the light source 3 to be transmitted through the subject to acquire a fingerprint image where the convex part of the fingerprint 11 is dark and the concave part is bright, and the optical system 4 for enabling the light transmitted through the subject from the light source 3 to be imaged on the image pickup unit 5, wherein the optical system 3 is arranged so that the distal side of the fingertip portion of the subject is tilted at a predetermined angle farther away from the optical system 3 than its opposite side with reference to a position at which the back side of the fingertip portion 1 is contacted on the face 402 orthogonal to the optical axis 400 of the optical system 3, whereby there is the effect that a stable fingerprint image with better contract can be produced, regardless of a wet state on a skin surface for fingerprint 11, even when the irregularities 11 of fingerprint are obscure.

In addition to the above constitution, the signal processing section 6 for processing the fingerprint image outputted from the image pickup unit 5 to produce the fingerprint information, and identify the person based on the fingerprint information is provided, whereby there is the effect that the precision of personal identification is improved.

Also, when the predetermined angle is from 10° to 30°, preferably from 15° to 25°, and more preferably about 20°, the fingerprint image with better contrast can be produced.

Also, since the marker light source 33 for emitting a marker light 31 for positioning the subject to the subject is provided, there is the effect that the positioning of the subject to the apparatus can be easily made.

Also, since the subject holding section 21 capable of holding the subject out of contact with the surface of the fingerprint to be photographed is provided, there is the effect that the position and angle of the subject in the optical system 3 can be easily adjusted.

Also, since the light 30 from the light source 3 has its center of illumination on the center line in the width direction on the face where the nail 12 exists at the fingertip portion 1 and on the opposite side of the nail 12 to the border of the nail 12 to illuminate any other portion than the nail 12, the fingerprint image with proper lightness can be produced in a range where the fingerprint information required for personal identification that is the main part of the fingerprint image is contained, whereby the correct fingerprint information can be obtained by preventing a degradation in the fingerprint image due to the lightness.

EMBODIMENT 2

Figure 14:
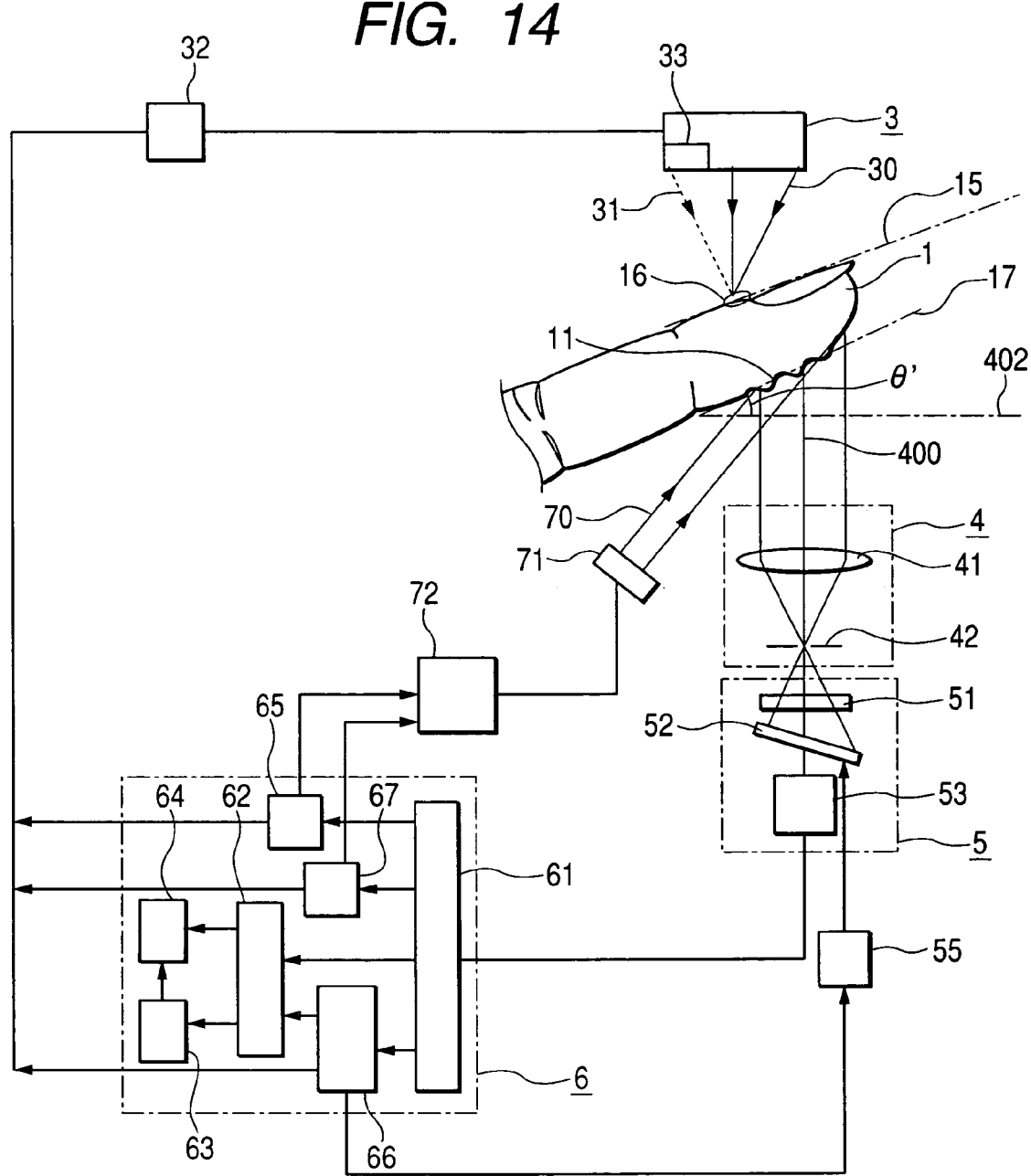
FIG. 14 is a side view showing the overall constitution of a fingerprint image pickup device according to an embodiment 2 of the invention.
Figure 15:
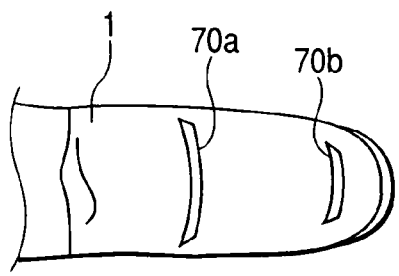
FIG. 15 is a bottom view showing a situation near the fingertip portion as seen from the ventral side according to the embodiment 2 of the invention.

FIGS. 14 and 15 are views for explaining a fingerprint image pickup device according to an embodiment 2 of the invention. More specifically, FIG. 14 is a side view showing the overall constitution of the fingerprint image pickup device, and FIG. 15 is a bottom view showing a situation near the fingertip portion as seen from the image pickup system side (ventral side).

In the following, the different points from the embodiment 1 will be mainly described.

In this embodiment, unlike the embodiment 1, the subject holding section with opening 21 does not exist, but instead, a finger position measuring light source (position measuring light source) 71 for emitting a finger position measuring light 70 and a finger position measuring light source drive circuit 72 are installed to measure the distance from the image pickup element 53 to the fingertip portion 1 (ventral side of the fingertip portion 1) and the angle made between the observation face 100 (ventral side of the fingertip 1) and the face 402 (orthogonal to the optical axis, 400 of the optical system 4), and a finger position measuring section 67 is provided within the signal processing section 6.

The finger position measuring light source drive circuit 72 receives a signal indicating that the fingertip portion 1 exists in an image pickup range of the image pickup element 52, and then turns on the finger position measuring light source 71 to emit a finger position measuring light 70 to the ventral side (surface of the fingerprint 11) of the fingertip portion 1. The fingerprint position measuring light source 71 is placed so that the finger position measuring light 70 may pass through the range where the optical system 4 and the image pickup system 5 are focused.

A reflected light of the finger position measuring light 70 applied to the ventral side (surface of the fingerprint 11) of the fingertip portion 1 is incident upon the image pickup element 52, and converted into an image electrical signal by the image output circuit 53, and the image electrical signal is sent to the image receiving section 61 of the signal processing section 6.

The finger position measuring light source 71 for emitting the finger position measuring light 70 may be composed of a highly directional light emitting diode and a slit, or a semiconductor laser and a slit, for example. In the case of the slit, one or more slit lights can be emitted. The shape of the finger position measuring light source 71 is not limited to the slit-like continuous line, but maybe a point, a sequence of points on the straight line, a lattice shape or a random pattern, or any one of various patterns useful for measuring the distance to the target according to a principle of trigonometrical survey.

The finger position measuring section 67 receives a signal from the image receiving section 61, and measures whether or not the ventral side (observation face 100) of the fingertip portion 1 exists within the depth of field of the optical system 4, and the angle made between the observation face 100 and the face 402 is from 10° to 30°, more preferably from 15° to 25°, and most preferably about 20°. If the condition is satisfied, a signal is outputted to the light source drive circuit 32 to turn on the light source 3.

Next, the operation will be described below.

Though the positioning is made by the subject holding section with opening 21 holding the fingertip portion 1 in the embodiment 1, the position measurement for positioning is made by applying the finger position measuring light 70 in this embodiment.

This embodiment is the same as the embodiment 1, until the finger existence determination section 65 determines that the image pickup is in a ready state because the fingertip portion 1 is within the image pickup range of the optical system 4 and the image pickup system 5. In the ready state, the finger existence determination section 65 sends a signal to the finger position measuring light source drive circuit 72 to drive the finger position measuring light source 71 to emit the finger position measuring light 70.

As the finger position measuring light 70, if two slit lights are turned on as shown in FIG. 15, the position where the reflected light is incident upon the image pickup element 52 is decided through image processing in the signal processing section 6 for each slit, whereby the distance from the position where the finger position measuring light 70 is applied on the observation face 100 to the image pickup element 52 is obtained by a method of trigonometrical survey in the finger position measuring section 67. Owing to two or more slit lights, the angle made between the observation face 100 (more accurately, a face 17 passing through the illuminating portions 70a and 70b of each slit light 70 to the ventral side of the fingertip portion 1, hereinafter referred to as a face 17 representing the ventral side (observation face) of the fingertip portion 1) from the relationship between the distance between slit lights and the distance between the slit light and the image pickup element 52 is obtained.

As the distance value, the shortest distance, the average distance or the least square distance is employed for each slit light in accordance with a trade-off between the computation amount and the precision.

For the spot light conforming to the slit light, the distance between the position where the finger position measuring light 70 is applied on the observation face 100 and the image pickup element 52 and the angle between the observation face 100 and the face 402 are similarly obtained.

If the result measured by the finger position measuring section 67 is within the depth of field of the optical system 4.and the image pickup system 5, and the angle made between the observation face 100 and the face 402 is from 10° to 30°, more preferably from 15° to 25°, and most preferably about 20°, the finger position measuring section 67 sends a signal to the finger position measuring light source drive circuit 72 to turn off the finger position measuring light source 71, and sends a signal to the light source drive circuit 32 to turn on the light source 3 at a predetermined quantity of light to be transmitted through the fingertip portion 1, whereby the fingerprint image is picked up with the transmitted light.

In the embodiment 1, the optical system 4 is arranged so that the distal side of the fingertip portion of the subject is tilted at a predetermined angle farther away from the optical system 4 than its opposite side, namely, the angle (θ) made between the straight line 15 representing the backside of the fingertip portion 1 and the face 402 is a predetermined angle, with reference to a position at which the back side of the fingertip portion 1 is contacted on the face 402 orthogonal to the optical axis 400 of the optical system 4, whereby the contrast of the fingertip image is improved.

On the other hand, in this embodiment, the optical system 4 is arranged so that the distal side of the fingertip portion of the subject is tilted at a predetermined angle farther away from the optical system 4 than its opposite side, namely, the angle (θ') made between the straight line 17 representing the ventral side (observation face) of the fingertip portion 1 and the face 402 is a predetermined angle (from 10° to 30°, more preferably from 15° to 25°, and most preferably about 25°), with reference to a position at which the ventral side of the fingertip portion 1 is contacted on the face 402 orthogonal to the optical axis 400 of the optical system 4, whereby the contrast of the fingertip image is improved.

The plane 17 representing the Ventral side (observation face) of the fingertip portion 1 and the straight line 15 representing the back side of the fingertip portion 1 are not parallel but placed at a slight angle, which depends on personal error. However, the angle made between the plane 17 representing the ventral side (observation face) of the fingertip portion 1 and the straight line 15 representing the back side of the fingertip portion 1 and the personal error are contained in a range of the angle (θ) (from 10° to 30°, preferably from 15° to 25°) made between the straight line 15 representing the back side of the fingertip portion 1 and the face 402 orthogonal to the optical axis 400 of the optical system 4 as described in the embodiment 1. In this embodiment, the angle (θ') made between the plane 17 representing the ventral side (observation face) of the fingertip portion 17 and the face 402 is contained within the above range (from 10° to 30°, preferably from 15° to 25°), whereby the fingerprint image with better contrast is obtained in the same way as in the embodiment 1 in which the fingertip portion 1 is held by the subject holding section with opening 21 or the rod-like subject holding section 22.

For the same reason as above, in the embodiment 1, an opening face (plane representing the ventral side (observation face) of the fingertip portion 1) surrounded by face of the subject holding section with opening 21 or the rod-like subject holding section 22 on the side contacted by the fingertip portion 1 is tilted at a predetermined angle (from 10° to 30°, preferably from 15° to 25°) to the face 402 orthogonal to the optical axis 400 of the optical system 4.

In this way, according to this embodiment, there is provided the position measuring light source 71 for emitting the position measuring light (finger position measuring light 70) to the surface of the fingerprint 11 to be photographed for the subject 1 in which the surface of the fingerprint 11 to be photographed is out of contact with the structure, in which the reflected light of the position measuring light 70 applied on the surface of the fingerprint 11 is picked up by the image pickup unit 5, and the distance between the surface of the fingerprint 11 and the optical system 4 and the inclination angle from the face 402 orthogonal to the optical axis 400 of the optical system 4 are detected. Thereby, the image is picked up in a state where the fingertip portion 1 is at the optimal angle to the optical axis 400 of the optical system 4 by detecting the position and shape (inclination angle) of the surface of the fingerprint 11 out of contact with the surface of the fingerprint 11 at the fingertip portion 1, whereby the fingerprint image with bettwe contrast can be produced.

Though the fingertip portion 1 is completely out of contact with the structure in FIG. 14, the rod-like subject holding section may be place closer to the root side than the part of the fingerprint 11 of the fingertip portion 1, whereby there is the effect that the position of the subject can be decided to some extent, in addition to the above effect.

EMBODIMENT 3

Figure 16:
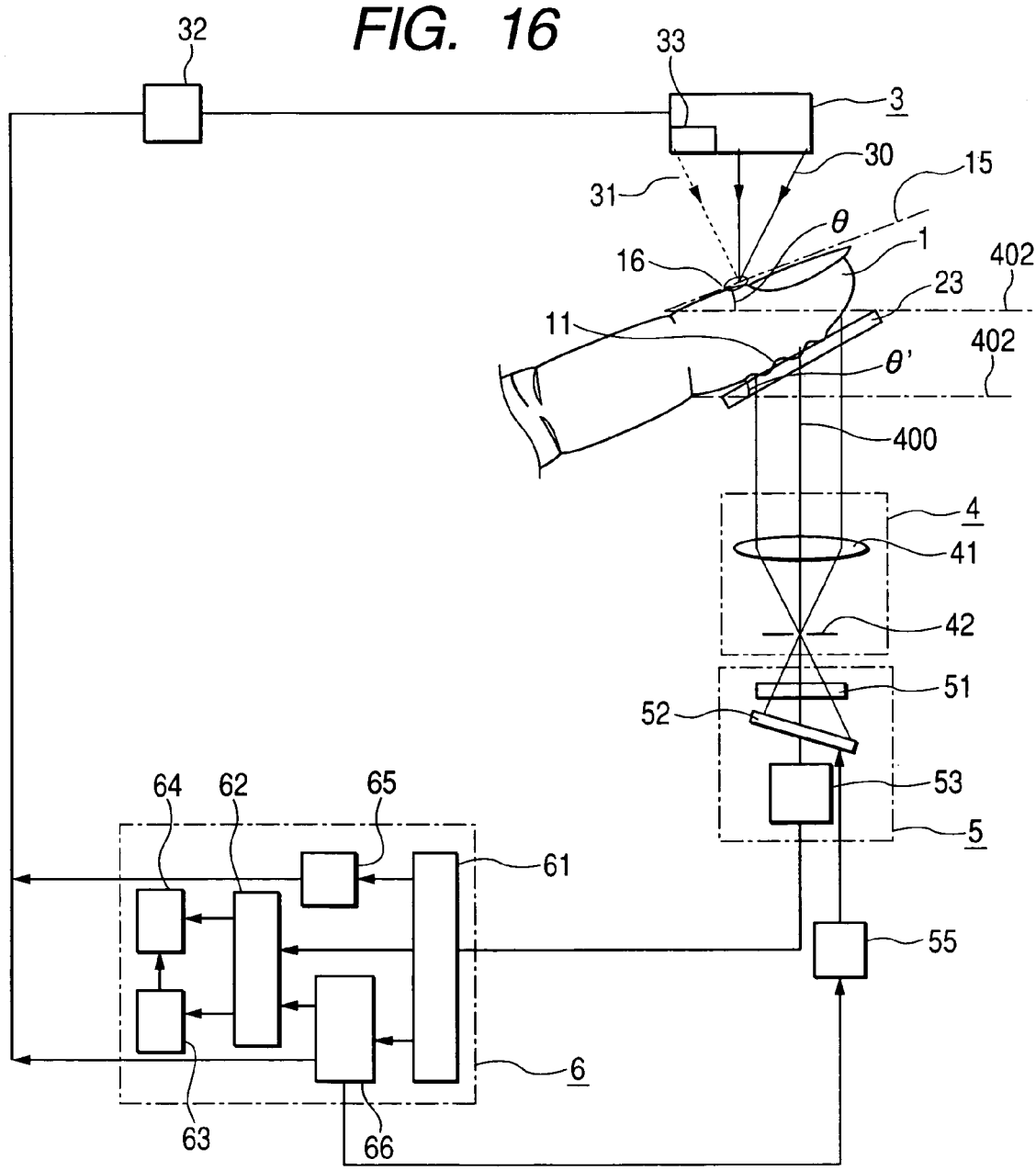
FIG. 16 is a side view showing the overall constitution of a fingerprint image pickup device according to an embodiment 3 of the invention.

FIGS. 15 and 16 are views for explaining a fingerprint image pickup device according to an embodiment 3 of the invention. More specifically, FIG. 15 is a side view showing the overall constitution of the fingerprint image pickup device, and FIG. 16 is a typical enlarged view showing a contact portion between a transparent subject holding section and the subject.

In the following, the different points from the embodiment 1 will be mainly described.

Though the subject holding section (subject holding section with opening 21 or rod-like subject holding section 22) capable of holding the fingertip portion 1 out of contact with the surface of the fingerprint 11 to be photographed is provided in the embodiment 1, a transparent subject holding section (hereinafter referred to as a transparent subject holding section) 23 capable of holding the subject having the fingerprint in contact with the surface of the fingerprint to be photographed is provided in this embodiment.

The transparent subject holding section 23 is equivalent in the installed position and function to the subject holding section with opening 21 of the embodiment 1, except for the presence of the opening. That is, θ and θ' are set to from 10° to 30°, more preferably from 15° to 25°, and most preferably about 20°.

The operation is the same as in the embodiment 1. The same effect is obtained as in the embodiment 1.

Figure 17:
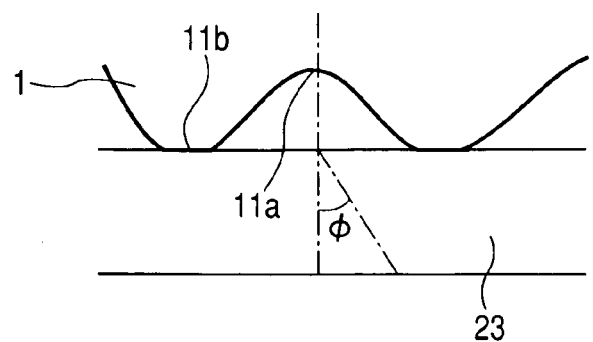
FIG. 17 is a typical enlarged view showing a contact portion between a transparent subject holding section and the subject according to an embodiment 3 of the invention.

To acquire a fingerprint image in which the convex part of the fingerprint 11 is dark and the concave part is bright by picking up the light from the light source 3 to be transmitted through the convex part of the fingerprint 11 and the light from the light source 3 to be transmitted through the concave part of the fingerprint 11, it is required that the light incident on the transparent subject holding section 23 is detected in a direction at or below the critical angle θ of total reflection that is decided by the refractive index of the gas between the concave part 11a of fingerprint and the transparent subject holding part 23 and the refractive index of the transparent subject holding section 23 on the fingerprint contact face of the transparent subject holding section 23, as shown in FIG. 17.

For example, assuming that the gas between the concave part 11a of the fingerprint and the transparent subject holding section 23 is the air, and the transparent subject holding section 23 is glass, the refractive index n0 of the air is 1.0, and the refractive index ng of glass is 1.5, the critical angle φ is φ=arcsin(n0/ng)=41 (degrees), whereby the light transmitted through the concave part 11a of fingerprint is incident upon the transparent subject holding section 23 at an angle of 41° or less.

On the other hand, assuming that the refractive index of the living body is 1.45, arcsin (1.45/1.5)=75 (degrees), whereby the light transmitted through the convex part 11b of fingerprint is incident upon the transparent subject holding section 23 at an angle of 75° or less.

Accordingly, it is possible to detect both the light transmitted through the convex part 11b of the fingerprint and the light transmitted through the concave part 11a by detecting the light incident upon the transparent subject holding section 23 at an angle of 41° or less.

EMBODIMENT 4

In the embodiment 1, the light 30 from the light source 3 has its center of illumination on the center line in the width direction on the face where the nail 12 exists at the fingertip portion 1 and on the opposite side of the nail 12 to the border of the nail 12 to illuminate any other portion (illumination area 16 such as first to third illumination areas 161 to 163) than the nail 12, whereby a fingerprint image with clear shading contract at the proper lightness is produced in a range where the fingerprint information required for personal identification that is the main part of fingerprint image is contained.

However, there maybe a portion where the ridge and trough of the fingerprint can not be discriminated in a range where the fingerprint information required for personal identification that is the main part of fingerprint image is contained, because the brightness is saturated or too low, resulting in the fingerprint image from which the information required for personal identification is not extracted.

Thus, in this embodiment, the lightness of the image is adjusted by adjusting at least one of the light illuminating condition (brightness, illumination area 16) and the gain of the image pickup unit 5 (image pickup element 52), a plurality of fingerprint images having different lightness are picked up for the same subject, and superposed or partially bonded, as described below, whereby the fingerprint image with clear shading contrast at the proper lightness is produced in a range where the fingerprint information required for personal identification that is the main part of fingerprint image is contained, providing the more correct fingerprint information by securely preventing a degradation in the fingerprint image due to the lightness.

In the following, the different points from the embodiment 1 will be mainly described. The light 30 is applied from the light source 3 at a predetermined brightness to the prescribed illumination area 16, and an image is firstly picked up at the prescribed gain of the image pickup element 52. The image is sent from the image receiving section 61 to the lightness determination section 66, where the overall lightness is determined in the range containing the fingerprint information required for personal identification that is the main part of the fingerprint image. If the lightness is not proper, at least one of the brightness and the illumination area of the light source 3 by the light source drive circuit 32, and the gain by the gain adjustment circuit 55 is adjusted to make the lightness proper, and then the image is picked up again in the game way as in the embodiment 1.

Herein, the overall lightness includes the lightness of the entire image that is judged from the overall lightness without the positional information for every pixel such as a histogram, the lightness of specific region, or the lightness in a narrow range such as a small number of profiles, in which the image may or may not contain partially too bright or too dark portion.

The image where the overall lightness is proper in the area including the range containing the fingerprint information required for personal identification that is the main part of the fingerprint image is partitioned into plural partial areas by the lightness determination section 66 to determine the lightness of image in each partial area. The plural partial areas may be two partial areas into which the entire area is divided on the distal side and the root side, or plural partial areas containing at least one or more pairs of ridge and trough of fingerprint that are extracted from the entire area.

If all the partial areas obtained in this way satisfy the proper lightness within the predetermined range of threshold, the image information of the image is sent to the image processing section 62 to extract the fingerprint information for personal identification or saving the fingerprint data.

Also, if there is at least one portion where the lightness of image is outside the predetermined range of threshold in each partial area, at least one of the brightness and illumination area of the light source 3 by the light source drive circuit 32 and the gain by the gain adjustment circuit 55 is adjusted to make the lightness of the entire partial area proper, and the image is picked up again, whereby the image is taken in from the image receiving section 61, and temporarily saved. The above operation is performed for all the partial areas having at least one portion in which the lightness of image is outside the predetermined range of threshold, and the obtained image is temporarily saved in the image receiving section 61.

Next, the temporarily saved image is sent from the image receiving section 61 to the image processing section 64, where plural images are superposed or the partial areas satisfying the proper lightness within the predetermined range of threshold are segmented and bonded to acquire the image having proper lightness over the entire face in the range containing the fingerprint information required for personal identification.

Though in the above example, the image in which the overall lightness of the area including the range containing the fingerprint information required for personal identification that is the main part of the fingerprint image, or the lightness of prescribed specific region is proper, is partitioned into a plurality of partial areas, to determine the lightness of image in, each partial area, and determine whether or not a plurality of images are picked up, a plurality of images having different lightness in which at least one of the illuminating condition and the gain of the image pickup element 52 is changed may be picked up from the beginning without determining the lightness of image in each partial area.

In this case, there is a method for picking up a plurality of images in which two or more kinds of threshold of lightness are decided in determining the lightness at the first time after picking up the image at the first time, and the brightness, illuminating position and illumination area of the light source 3 and the value of gain of the image pickup element 42 are decided to make the lightness of image corresponding to a respective threshold. That is, the threshold at which the almost entire face in the range containing the fingerprint information required for personal identification has proper lightness, and the threshold at which the image is brighter than the proper lightness but has no too dark portion or at which the image is darker than the proper lightness but has no saturated portion may be considered. The plurality of images obtained in this way are superposed or bonded to make one sheet of image.

The images superposed or bonded by the image processing section 62 may be the images before or after the processing of binarization.

In the case where a plurality of images having different lightness picked up for the same subject are superposed or bonded, it is important to make the image pickup interval as short as possible to prevent dislocation of the fingertip 1.

Though the fingerprint image pickup device of the embodiment 1 is exemplified in the above example, the same effect can be achieved in such a way that the lightness of the image is adjusted by adjusting at least one of the light illuminating condition (brightness, illumination area 16) and the gain of the image pickup unit 5 (image pickup element 52), a plurality of fingerprint images having different lightness are picked up for the same subject, and superposed or partially bonded in the fingerprint image pickup device of the embodiment 2 or 3.

As described above, with this embodiment, since the fingerprint image pickup device further includes a unit (lightness determination section 66, light source drive circuit 32, gain adjustment circuit 55) that adjusts the lightness of image by adjusting at least one of the light illuminating condition and the gain of the image pickup unit 5 (image pickup element 52), and a unit (image processing section 62) that superposes or partly bonds a plurality of fingerprint images having different lightness for the same subject, the fingerprint image has clear shading contrast at the proper lightness in the range containing the fingerprint information required for personal identification that is the main part of the fingerprint image. Consequently, the correct fingerprint information is obtained by preventing a degradation in the fingerprint image due to the lightness.

What is claimed is:

1. A fingerprint image pickup device comprising:
a light source emitting light along an optical axis for transmission through a fingertip portion having a fingerprint to be photographed;
an image pickup unit that picks up the light from the light source that is transmitted through the fingertip portion to acquire a fingerprint image in which a convex part of the fingerprint is dark and a concave part of the fingerprint is bright;
an optical system forming an image of the light from the light source that is transmitted through the fingertip portion to the image pickup unit; and a fingertip holding section supporting the fingertip portion tilted at an oblique angle relative to the optical axis, with a distal end of the fingertip portion farther away from the optical system than a proximal part of the fingertip portion.

2. The fingerprint image pickup device according to claim 1, wherein the angle is in a range from 10° to 30°.

3. The fingerprint image pickup device according to claim 1, wherein the angle is in a range from 15° to 25°.

4. The fingerprint image pickup device according to claim 1, further comprising a marker light source for emitting a marker light for indicating whether a fingertip portion is in position for forming a photograph of the fingerprint.

5. The fingerprint image pickup device according to claim 1, wherein the fingertip holding section supports part of the fingertip portion without contacting a surface of the fingerprint to be photographed.

6. The fingerprint image pickup device according to claim 1, wherein the fingertip holding section is transparent for supporting the fingertip portion in contact with a surface of the fingerprint to be photographed.

7. A fingerprint image pickup device comprising:
a light source emitting light along an optical axis for transmission through a fingertip portion having a fingerprint to be photographed;
an image pickup unit that picks up the light from the light source that is transmitted through the fingertip portion to acquire a fingerprint image in which a convex part of the fingerprint is dark and a concave part of the fingerprint is bright;
an optical system forming an image of the light from the light source that is transmitted through the fingertip portion to the image pickup unit; and
a position measuring light source emitting position measuring light to a surface including the fingerprint to be photographed, with a surface of the fingerprint to be photographed out of contact with any structure, wherein
a reflected portion of the position measuring light emitted that is reflected from the surface including the fingerprint is picked up by the image pickup unit, and
the optical system includes a finger position measuring section detecting, from the reflected portion of the position measuring light,
(i) distance of the surface including the fingerprint from the optical system, and
(ii) inclination angle of the surface including the fingerprint with respect to a plane orthogonal to the optical axis.

8. The fingerprint image pickup device according to claim 1, wherein
the light from the light source illuminates a portion other than a nail of the fingertip portion, and
the light has a center of illumination lying on the optical axis, in a width direction, of a face where the nail of the fingertip portion is located and on a skin side of a border of the nail and skin of the fingertip portion.

9. The fingerprint image pickup device according to claim 1, further comprising a unit that adjusts lightness of an image by adjusting at least one of a light illuminating condition and gain of the image pickup unit.

10. The fingerprint image pickup device according to claim 9, further comprising a unit that superposes or partly joins a plurality of fingerprint images having different lightnesses for the same fingertip portion.

11. The fingerprint image pickup device according to claim 8, further comprising a unit that adjusts lightness of an image by adjusting at least one of a light illuminating condition and gain of the image pickup unit.

12. The fingerprint image pickup device according to claim 11, further comprising a unit that superposes or partly joins a plurality of fingerprint images having different lightnesses for the same fingertip portion.

13. The fingerprint image pickup device according to claim 1, further comprising a signal processing section for acquiring fingerprint information by image processing a fingerprint image output from the image pickup unit and identifying a person based on the fingerprint information.

14. The fingerprint image pickup device according to claim 8, further comprising a signal processing section for acquiring fingerprint information by image processing a fingerprint image output from the image pickup unit and identifying a person based on the fingerprint information.

15. The fingerprint image pickup device according to claim 7, wherein the angle is in a range from 10° to 30°.

16. The fingerprint image pickup device according to claim 7, wherein the angle is in a range from 15° to 25°.

17. The fingerprint image pickup device according to claim 7, further comprising a marker light source for emitting a marker light for indicating whether a fingertip portion is in position for forming a photograph of the fingerprint.

18. The fingerprint image pickup device according to claim 7, wherein
the light from the light source illuminates a portion other than a nail of the fingertip portion, and
the light has a center of illumination lying on the optical axis, in a width direction, of a face where the nail of the fingertip portion is located and on a skin side of a border of the nail and skin of the fingertip portion.

19. The fingerprint image pickup device according to claim 7, further comprising a unit that adjusts lightness of an image by adjusting at least one of a light illuminating condition and gain of the image pickup unit.

20. The fingerprint image pickup device according to claim 7, further comprising a signal processing section for acquiring fingerprint information by image processing a fingerprint image output from the image pickup unit and identifying a person based on the fingerprint information.

* * * * *